June 15, 1965  C. L. BABB  3,189,671

METHOD OF MAKING A RUBBER LINED IMPELLER

Original Filed April 14, 1959  2 Sheets-Sheet 1

Inventor
Charles L. Babb
By Austin L. Swenson
Attorney

June 15, 1965  C. L. BABB  3,189,671
METHOD OF MAKING A RUBBER LINED IMPELLER
Original Filed April 14, 1959  2 Sheets-Sheet 2

Inventor
Charles L. Babb
by Houston L. Svenson
Attorney 3,189,671
METHOD OF MAKING A RUBBER
LINED IMPELLER
Charles L. Babb, Brookfield, Wis., assignor to Allis-Chalmers Manufacturing Company, Milwaukee, Wis.
Continuation of application Ser. No. 806,351, Apr. 14, 1959. This application Feb. 12, 1962, Ser. No. 174,654
4 Claims. (Cl. 264—247)

This invention relates to centrifugal pumps and more particularly to rubber lined impellers for centrifugal pumps and is a continuation of application S.N. 806,351, filed April 14, 1959, by Charles L. Babb, entitled "Rubber Lined Impeller and Method of Making Same" and now abandoned.

In a variety of industries there is a demand for a centrifugal pump capable of resisting the abrasive action of liquid suspended coarse materials. With pumps having standard metal surfaced impellers the abrasive material gradually scores and pits the impeller's surface. This eventually requires a work stoppage and replacement of the impeller. To solve this problem the past has seen the use of an impeller lining of rubber or similar resilient material capable of handling various abrasive solids. With open type impellers it is relatively simple to mold a rubber covering having the various curvatures needed to provide an efficient pump. However, with closed type impellers of the past there have been undesirable sharp molded edges which reduce the efficiency of the pump.

In particular, rubber lined closed impellers of the past have been molded with a sharp right angle corner about the inner periphery of the impeller's intake. This sharp corner is in effect a projection which prevents the incoming liquid from following a smoothly curved flow course into the impeller vanes. The consequence is flow turbulence causing a drop in the pump's efficiency.

The impeller of this invention has a unitary rubber molded coating with a convex surface for the periphery of the intake whereby an increase in efficiency is obtained. Inasmuch as the power now required to drive the pump at a specific rating is less, the size of the driving motor may be reduced.

It is, therefore, one object of this invention to manufacture for use in a centrifugal pump a new and improved closed type impeller having a bonded unitary rubber coating.

Another object of this invention is to manufacture for use in a centrifugal pump a new and improved rubber lined closed type impeller having a more efficient intake.

A further object of this invention is a method of forming a rubber lined closed type impeller having free flowing surfaces.

Objects and advantages other than those set forth above will be apparent from the following description when read in connection with the accompanying drawing in which.

Figure 1:
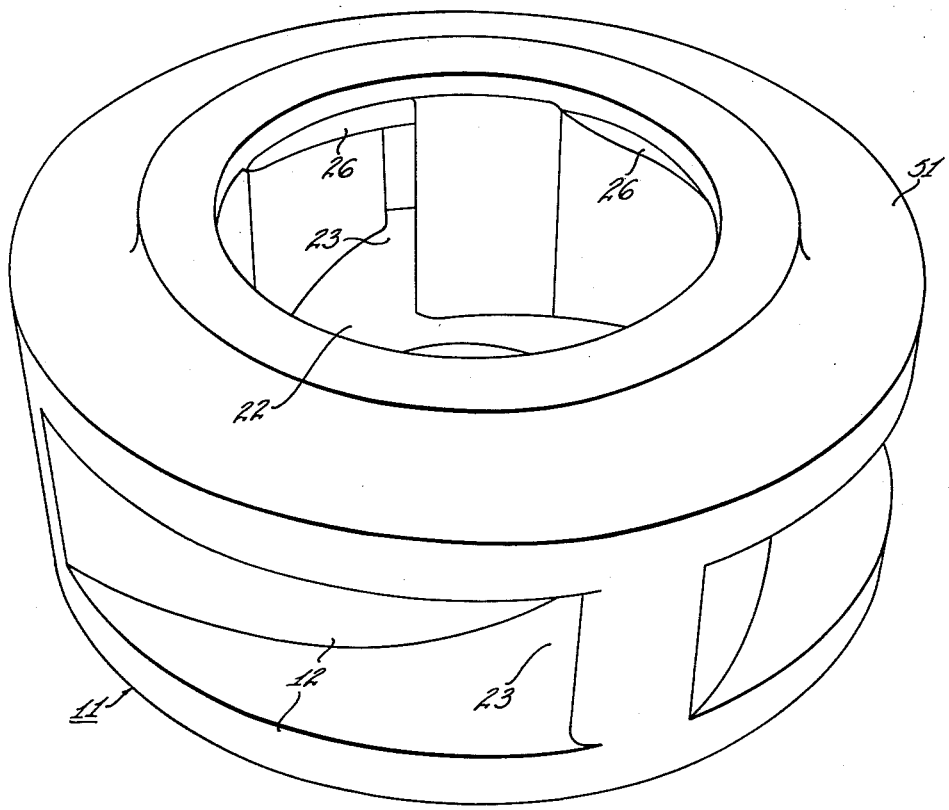
FIG. 1 is a perspective view of a rubber covered closed type impeller formed in accordance with this invention.

In accordance with this invention and as illustrated in FIG. 1 a rubber lined closed type impeller 11 is provided in which a rubber covering 12 cooperates to provide a final form of unitary construction, that is, a one piece article. The impeller comprises an annular ring 16 and a disk 17 (see FIG. 2) in axial relation for concentric mounting about a pump shaft, not shown. Mounted between the ring 16 and disk 17 are a plurality of radially extending arcuate metal vanes 18, one of which is shown. Disk 17 is provided with an internally threaded hub member 21 for receiving the pump shaft. When assembled the ring and disk and vanes 18 form the impeller's skeleton 19 which reinforces the rubber cover 12.

Ring 16 defines an inlet or suction opening 22 through which incoming fluid flows. Inlet 22 is in hydraulic communication with passages 23 formed by the vanes 18 and ring and disk. To strive toward a pump of high efficiency the flow path through the inlet 22 and into the passages 23 should have a smooth contour providing turbulence free flow. The pump of this invention has achieved this goal by providing about the inner periphery of inlet 22 a molded rubber convex surface 26 (FIG. 2) which is unitary with the other surfaces of the molded impeller.

Figure 2:
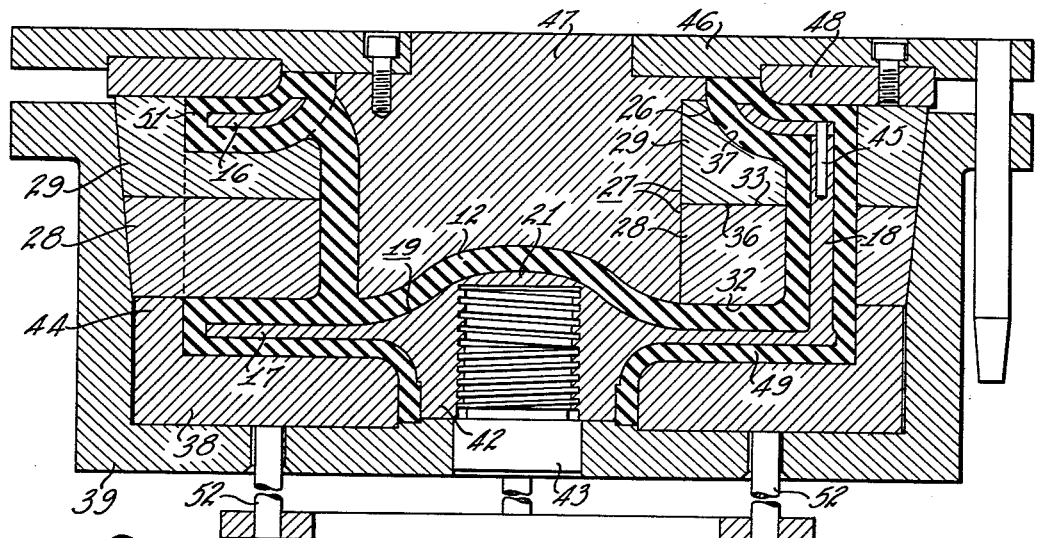
FIG. 2 is a cross sectional view of the impeller and a cylindrical mold used to form the impeller.

In manufacturing a rubber lined closed type impeller having a convex surface 26 in the inner portion of the inlet 22 split blade forming cores 27 are used. These split blade cores are used to form the layers of rubber 12 or other similar material about the impeller skeleton 19 and must be designed in such a manner as to permit removal of the blade cores without damaging the molded impeller. Thus, as illustrated in FIG. 2 and more clearly in FIG. 3, each blade core comprises two sections 28 and 29. The first core section 28 has two flat lateral surfaces 32 and 33, and the second section 29 has one flat lateral surface 36 with the other lateral surface having a concave surface 37. It is this concave surface in the second section that provides the convex surface 26 in the inlet of the impeller.

Figure 3:
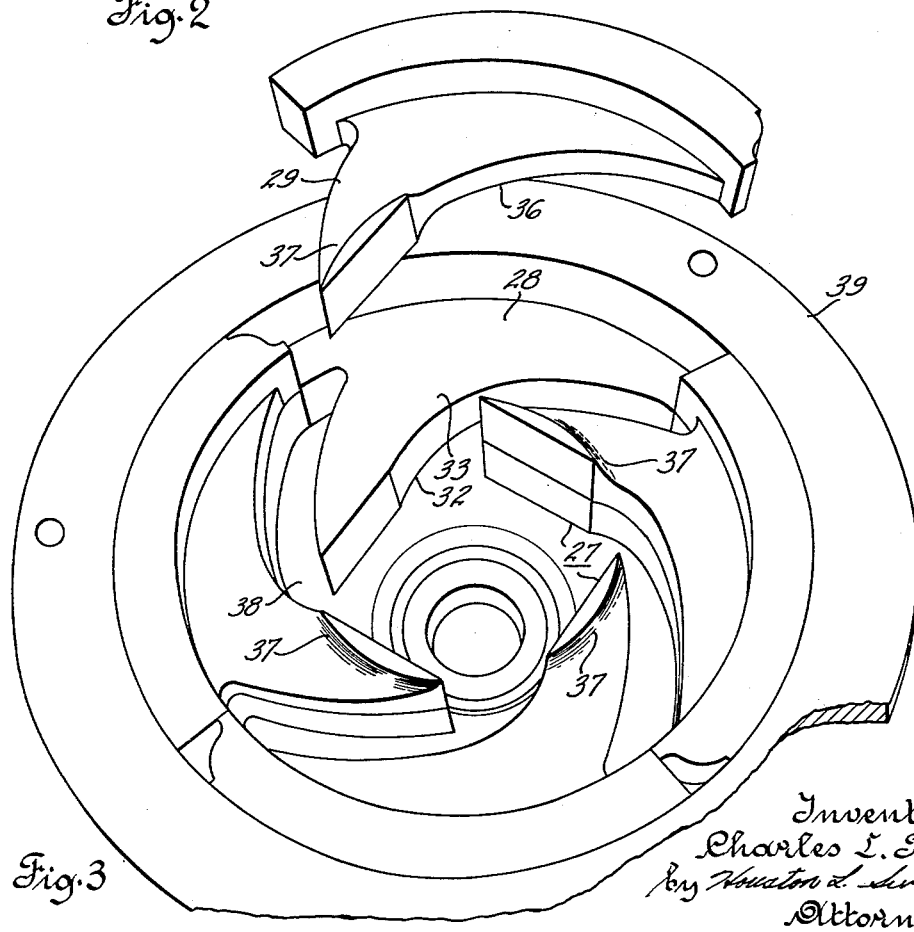
FIG. 3 is a partial perspective view of the mold with a mold element detached to show its special configuration.

In molding the impeller an annular extractor plate 38 is placed in the base of an appropriate molding tank 39. Disk 17 with vanes 18 secured thereto, such as by welds, is then placed on the extractor plate. Base 42 of impeller hub 21 is of a predetermined height in order to properly space the disk 17 to form the rubber molded covering about the disk. A threaded positioning plug 43 is inserted through the tank 39 and into the impeller hub 42 to center the impeller and prevent rubber from entering the hub. The first series of split core sections 28 are then placed over an extending ridge 44 of the extraction plate 38. As illustrated in FIGS. 2 and 3 these first sections extend radially outward and are spaced parallel to the impeller skeleton in order to give a proper thickness of rubber coating on the skeleton. The second series of core sections 29 which have the curved portion 37 are then placed over the first sections. Ring 16 is then located on the vanes 18 with the assistance of locating pins 45. The blade cores may be secured in their spaced relation by pins not shown.

Figure 4:
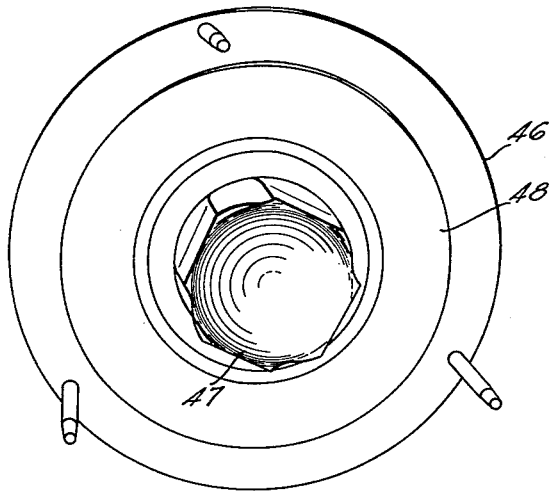
FIG. 4 is a perspective view of a cover for the mold of FIG. 3.

During assembly of the mold and impeller skeleton, unvulcanized rubber compound is introduced so that in subsequent curing operations the impeller skeleton is covered by rubber to a predetermined thickness. After introduction of the rubber a cover 46 as shown in FIGS. 2 and 4, with an inwardly extending inlet forming core 47 is secured to the tank. An inner protruding portion 48 of the cover cooperates with ring 16 in a spaced relationship to form the impeller's front shroud 51. Then the entire mold assembly is placed under high temperature and pressure for curing.

After the rubber 12 on the impeller skeleton 19 has become cured the tank cover 46 is taken off to remove the rubber lined impeller from the tank 39. Ejector pins 52 which extend through the bottom of the tank and are in contact with the extraction plate 38 and plug 43 are then pushed upwardly. In such a manner the extraction plate which supports the now rubber lined impeller and the blade cores is pushed upwardly and out of the tank.

The blade cores are now ready to be extracted from the impeller.

It should first be appreciated that conventional single unit blade cores cannot be extracted from a closed impeller if the cores have a curved surface 37 such as shown in the dual unit cores 28 and 29 of this invention. This is because blade cores for a closed impeller are laterally removed between the back plate 49 and front shroud 51 in a path coincident to centrifugal lines of action. If such a core is a single unit and has, in addition to its lateral curvature, a curved surface 37 extending upwardly into the inlet of the impeller then the molded surface 26 of the impeller's inlet would prevent lateral withdrawal of the core. The use of the split core sections 28 and 29 in this invention has overcome the aforementioned difficulty. The lower core section 28 of each blade is laterally removed past the outer periphery of the ring and disk. This is permissible because this section has only flat lateral surfaces 32 and 33. After the lower core sections have been removed the upper blade core sections 29 are moved down to the position originally assumed by the lower core sections 28. In such a position the upper core sections 29 are now clear of the inner convex surface 26 of the inlet and can be laterally removed.

The resulting product is a rubber lined closed type impeller with a flow surface having smooth gradually curved contour lines. In obtaining this result while molding the impeller in a unitary construction a more efficient and durable impeller is provided.

Although only one embodiment of this invention has been illustrated and described it will be apparent to those skilled in the art that various changes and modifications may be made therein without departing from the spirit of the invention or the scope of the appended claims.

Having now particularly described and ascertained the nature of my said invention and the manner in which it is to be performed, I declare that what I claim is:

1. In the method of forming a rubber molded closed type impeller having a skeleton comprising an annular ring and a disk spaced therefrom by plurality of vane members the steps of: positioning said skeleton in a tank mold with a blade core between each vane member in spaced relation therefrom and from said ring and said disk, each blade core being composed of two sections in contact along a plane substantially parallel to the plane of said disk; introducing an amount of rubber into said tank mold to form an integral coating about said skeleton; curing said rubber; laterally withdrawing the core sections adjacent said disk from between said vane members; moving the remaining core sections to the positions originally assumed by the removed core sections for like lateral withdrawal and laterally withdrawing said remaining core sections from between said vane members.

2. In the method of forming a rubber molded closed type impeller having a skeleton comprising an impeller ring and a disk spaced therefrom by a plurality of vane members and including an inlet defined by said annular ring the steps of: positioning said skeleton in a tank mold with a blade core positioned between each of said vane members; positioning an inlet core in said inlet in said annular ring, one of said cores being sectionalized to permit individual sectional removal thereof; introducing an amount of rubber into said tank mold to form an integral coating about said skeleton; curing said rubber; removing the other of said sections of said one of said cores; moving said one of said sections to the position originally occupied by said other of said cores for like removal thereof; and removing the other of said cores.

3. In the method of forming an integrally rubber molded closed type impeller having a metal skeleton comprising an annular ring and a disk having a plurality of circumferentially spaced vane members secured thereto the steps of: positioning said disk with said vanes in a tank mold; positioning a blade core between each vane member in spaced relation therefrom and from said disk, each blade core being composed of two sections in contact along a plane substantially parallel to the plane of said disk; securing said ring to said vanes in spaced substantially parallel relation to said disk; introducing an amount of rubber into said tank mold to form an integral coating about said skeleton; curing said rubber; laterally withdrawing the core sections adjacent said disk from between said vane members; moving said remaining core sections to the positions originally assumed by said removed core sections for like lateral withdrawal; and laterally withdrawing said remaining core sections from between said vane members.

4. In the method of forming an integrally rubber molded closed type impeller having a metal skeleton comprising an annular ring having the inner annular lip thereof curled upward and a disk spaced therefrom by a plurality of vane members the steps of: positioning said skeleton in a tank mold with a plurality of blade cores between each vane member in spaced relation therefrom and from said ring and disk, each blade core being composed of two sections in removable contact along a plane parallel to the plane of said disk, each core section remote from said disk having a concave surface adjacent said curved lip; introducing an amount of rubber into said tank mold to form an integral coating about said skeleton; curing said rubber; laterally withdrawing the core sections adjacent said disk from between said vane members; moving the remaining core sections to the positions originally assumed by the removed core sections for like lateral withdrawal; and laterally withdrawing said remaining core sections from between said vane members.

References Cited by the Examiner

UNITED STATES PATENTS

| | | | |
|---|---|---|---|
| 720,482 | 2/03 | Richard. | |
| 1,076,681 | 10/13 | Levine | 18—45 |
| 1,135,962 | 4/15 | Aylsworth. | |
| 1,380,798 | 6/21 | Hansen et al. | 103—114 |
| 1,768,933 | 7/30 | Riley | 18—59 |
| 1,967,182 | 7/34 | Allen | 103—114 |
| 2,029,333 | 2/36 | Miller | 103—114 |
| 2,120,277 | 6/38 | Grierson. | |
| 2,422,412 | 6/47 | Haarhoff. | |
| 2,452,752 | 11/48 | Hartrauft | 18—59 |
| 2,481,541 | 9/49 | Schneider. | |
| 2,975,481 | 3/61 | Kauffman | 103—115 XR |

ALEXANDER H. BRODMERKEL, *Primary Examiner.*

WILLIAM J. STEPHENSON, *Examiner.*